July 20, 1943. D. H. CLEWELL 2,325,005
GRAVITY METER
Filed June 21, 1941
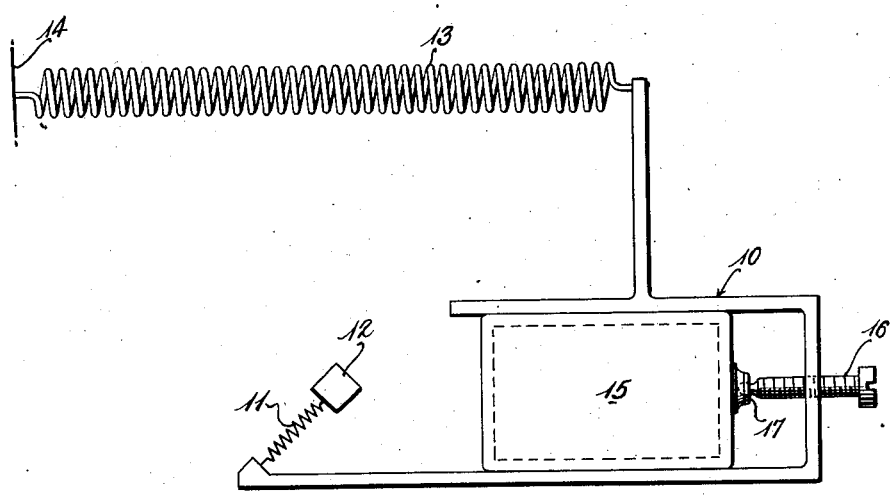
Inventor
Dayton H. Clewell
By
Dallas R. Lamont
Attorney Patented July 20, 1943

2,325,005

UNITED STATES PATENT OFFICE 2,325,005

GRAVITY METER

Dayton H. Clewell, Dallas, Tex., assignor to Socony-Vacuum Oil Company, Incorporated, New York, N. Y., a corporation of New York Application June 21, 1941, Serial No. 399,101

8 Claims. (Cl. 265—1.4)

This invention relates to gravity responsive instruments and more particularly to an improvement in gravity meters of the type used in geophysical prospecting.

One of the major problems in geophysical prospecting by the use of gravity meters arises from the fact that as a gravity meter is moved from point to point on the surface of the earth its elevation is changed because of the contours of the earth and this introduces a factor into the measurement that is unwanted. The usual procedure is to determine the elevation by surveying and then to eliminate this factor by calculation. Such a procedure, however, is slow and tedious and adds considerably to the difficulty of making a gravity meter survey.

According to the preferred form of this invention it has been discovered that the buoyancy force acting on the gravity meter mass also varies with elevation because of the variation in air pressure with elevation, and that this variation can be utilized to offset or compensate for the variation in gravitational force due to changes in elevation. Thus, by properly arranging the parts of any gravity responsive instrument, the change in buoyancy force acting on the instrument may be so balanced against the change in gravitational force acting on the instrument, at various elevations within the normal range of its intended use, that the one will balance the other and the instrument will give accurate indications, uninfluenced by changes in elevation.

Specifically, let us consider a horizontal, pivoted beam gravity meter. In such a gravity meter there is a mass which is to be acted upon by gravity and this mass is supported on a horizontal beam pivoted at one end for movement in a vertical plane and further supported by an elastic means which resists the motion about the pivot.

In such a gravity meter, the moment tending to swing the pivoted arm downward is equal to the mass of the arm, multiplied by the gravitational factor at the particular place where the mass is located, multiplied by the effective lever arm of the mass about the pivot. The gravitational factor undergoes a change as the elevation of the mass is changed and this change is of the order of .6 to .8 unit per foot of elevation. A unit is a $1 \times 10^{-7}$ portion of the normal gravitational attraction. Because the differences in elevation experienced in field work are extremely small with relation to the distance between the centers of gravity of the earth and the gravity meter mass there is substantially a straight line relation between the changes in the gravitational factor and the elevation throughout the range where the instrument will be used.

If we now consider the buoyancy moment of the same gravity meter mass, we find that it is equal to the volume of the displaced air, multiplied by the density of the air, multiplied by the effective lever arm of the force developed. A further investigation of the density of air reveals that it becomes progressively less dense at higher altitudes and that, over the range in which we are interested, the decrease in density is substantially a straight line function of the elevation. Thus as the elevation is increased and the density of the air becomes less the buoyancy moment also becomes less thus tending to compensate for the reduction in gravitational attraction which acts in the opposite direction.

It has been found that by properly adjusting the constants, such as the effective lever arm of the buoyancy force or gravitational force, or the density of the gravity meter mass, the change in gravity moment due to change in elevation may be compensated by the changes in buoyancy moment for the same changes in elevation.

To illustrate the principle of this invention, but not in any way to limit its scope, there is illustrated in the appended drawing a horizontal, pivoted beam type gravity meter in which is incorporated a hollow box, the position of which may be adjusted. This box serves to adjust the buoyancy moment relative to the gravity moment so that the two can be brought into balance and the effects of changes of elevation thereby overcome.

In the drawing, the sole figure is a diagrammatic view in side elevation of the essential parts of a horizontal pivoted beam type gravity meter embodying the principle of this invention.

As illustrated, a mass 10 is supported at one end through a pair of small coil springs 11, of which only one is visible in the drawing because the other is directly behind it, from a fixed support 12. These springs act as a pivot on which the mass may rotate in a vertical plane. This rotation is resisted by a main spring 13 which is attached at one end to the mass and at the other end to a fixed support 14.

Slideably mounted on the mass is a sealed hollow compartment 15, the position of which may be adjusted by a screw 16 threaded into the framework of the mass and attached through a ball connection 17 to the compartment 15. As the compartment 15 is moved nearer the pivot the buoyancy moment becomes progressively less. By proper positioning it may be made exactly equal for changes in elevation, to the changes in gravitational moment caused by the same changes in elevation.

It is only necessary to adjust the position of the compartment 15 once for a particular geographical area and the adjusting arrangement may be accessible from outside the instrument if desirable. Many other changes may also be made in the construction as for example by making the compartment 15 of some solid, light material, or by mounting the compartment 15 in a different way or in a different position. The hollow box may consist of a sealed metal bellows which can be compressed or expanded by an adjusting screw in order that the buoyancy moment may be adjusted by varying the volume of the mass instead of the lever arm of the center of buoyancy. It is to be understood therefore that while the specific construction herein described has been found advantageous and desirable, the invention is not limited specifically thereto.

In one specific design of gravity meter the main spring was 4.6 inches long, the mass weighed 70 grams and the hollow box had a volume of 80 cubic centimeters. It should be understood that the weight of the mass included the weight of the box.

A review of the mathematics involved in the new design is as follows:

The total buoyant force of the air surrounding the gravity meter mass is $$F = \frac{Mg\,D}{\rho}$$

$M$ = mass in grams
$D$ = density of air (gms./cc.)
$\rho$ = density of mass (gms./cc.)
$g$ = gravitational constant Changes in this buoyant force are given by $$dF = \frac{Mg}{\rho}dD$$

where $dD$ is the change in the density of the air and is derived from the following expression:

$$dD = 1.29 \times 10^{-3} \left(\frac{273}{T}\right)\frac{dB}{760}$$

$T$ = absolute temperature of air surrounding the mass
$dB$ = change in atmospheric pressure in mm. of Hg.

The changes in buoyancy force can now be written as a function of pressure:

$$dF = .463 \times 10^{-3} \frac{Mg}{\rho T} dB$$

However, the pressure changes $dB$ can also be expressed in terms of elevation:

$$dB = -\frac{b}{1 + .004t} \cdot \Delta h$$

$\Delta h$ = increment of elevation in feet
$b$ = constant for a particular area
$t$ = temperature of atmosphere in °C.

so that finally we write the changes in buoyancy force on the mass as a function of elevation:

$$dF = -\frac{.463 \times 10^{-3}}{1 + .004t} \cdot \frac{Mg\,b}{\rho t} \Delta h$$

showing that the buoyancy force decreases with an increase in elevation.

An increase in elevation also produces a change in the force of gravity according to the expression $$\frac{dg}{g} = -a.\Delta h$$

where $a$ is a constant for a particular area. The corresponding change in the weight of the mass is $$Mdg = -a\,Mg.\Delta h$$

For compensation to exist the increase in the weight of the mass must equal the increase in the buoyancy force or $$dF = M\,dg$$

so that $$-\frac{.463 \times 10^{-3}}{1 + .004t} \cdot \frac{Mg\,b}{\rho t} \cdot \Delta h = -a\,Mg.\Delta h$$

or $$\rho = \frac{.463 \times 10^{-3}}{1 + .004t} \cdot \frac{b}{aT}$$

An illustrative condition may be represented by assuming the following values:

$T = 50°$ C. $= 323°$ K. $=$ temperature of gravity meter
$t = 20°$ C. $=$ temperature of atmosphere
$b = 30 \times 10^{-3}$ mm. of Hg/ft.
$a = .70 \times 10^{-7}$ per ft.

from which we calculate that the density of the mass should be $$\rho = .57 \text{ gms./cc.}$$

for elevation compensation. One gravity meter mass at present in use consists of about 100 gms. of aluminum having a density of 2.7 gms./cc. and occupying a volume of 37 cc. To give this mass the required density of .66 gms./cc. it must be made to occupy a volume of 152 cc. which can be done by adding a thin walled hollow box of about 115 cc. of volume (a cube measuring 1.90 inches on each edge) at the center of gravity of the mass.

To adjust the mass for exact compensation the volume of the hollow box can be made adjustable. If the gravity meter is of the pivoted beam type, a box of fixed volume can be used and adjustment secured by sliding the box toward or away from the pivot axis.

Since the factor $t$ (the temperature of the atmosphere) is not exactly constant, exact compensation cannot be maintained at all times. However, the condition for compensation is only 0.4 percent as sensitive to $t$ as it is to the other factors and the variations in $t$ can be accounted for by means of a small correction factor which can be derived from a rough measurement of the atmospheric temperature and a rough measurement of the elevation by an altimeter of standard commercial type which is capable of measuring to about twenty feet.

Although a single form of this invention has been described in detail it is to be understood that any means whereby changes in barometric pressure caused by changes in elevation are made to influence the gravity responsive element of the gravity meter so as to compensate for the changes in gravity caused by the same change in elevation are contemplated by this application. For example, it would be possible to arrange a barometer in such a manner as to control an electrostatic field that would exert a force on the gravity responsive element that would be equivalent to the buoyancy force described above.

I claim:
1. A horizontal, pivoted beam type gravity meter in which the gravity responsive element has a weight and volume distribution such that changes in gravity moments therein due to changes in elevation will be compensated by changes in buoyancy moments therein due to the same changes in elevation.

2. A horizontal, pivoted beam type gravity meter in which a sealed air compartment is attached to the beam and arranged to be slidable thereon, so as to permit the relative adjustment of the buoyancy and gravity moments so that changes therein due to elevation will cancel each other.

3. An instrument for measuring changes in gravity comprising a gravity responsive member having a mass to volume ratio such that changes in the buoyancy force on said member due to changes in the elevation of said member may be expressed by the equation $$dF = M\, dg$$

where $dF$ is the change in the upward buoyancy force on said member due to changes in the density of the air surrounding said member produced by the change in elevation, $M$ is the mass of the gravity responsive member and $dg$ is the change in the force of gravity produced by the same change in elevation.

4. An instrument for measuring changes in gravity comprising a gravity responsive member having a mass to volume ratio such that changes in gravity forces acting on the gravity responsive member due to changes in elevation will be compensated by a substantially equivalent change in the buoyancy effect due to directly proportional changes in the density of the air produced by the same changes in elevation.

5. An instrument for measuring changes in gravity comprising a gravity responsive member having a mass to volume ratio such that the specific gravity of the member is substantially equal to $$\frac{.463 \times 10^{-3}}{1 + .004t} \cdot \frac{b}{aT}$$

where $b$ is a constant in any particular geophysical area equal to the change in atmospheric pressure, expressed as millimeters of mercury, caused by a one foot change in elevation, $t$ is the temperature of the atmosphere in degrees centigrade, $T$ is the temperature in degrees Kelvin of the gravity responsive member and its immediate environment, and $a$ is a constant in any particular geophysical area and is equal to the fractional change in the force of the gravity per foot change in elevation.

6. An instrument for measuring changes in gravity comprising a gravity responsive member and a sealed air compartment carried thereby, having a weight and volume distribution such that changes in gravity forces acting on the gravity responsive member due to changes in elevation will be compensated by a substantially equivalent change in buoyancy effect of said member and compartment due to directly proportional changes in the density of air produced by the same changes in elevation.

7. An instrument for measuring changes in gravitational force comprising a pivoted gravity responsive member, resiliently supported against the force of gravity and free to rotate about a horizontal axis due to the influence of changes in gravitational force, means for adjusting the moment of air buoyancy relative to the moment of gravity so that changes in the elevation of the gravity responsive members produce equal increments in the moment of air buoyancy and moment of gravity.

8. An instrument for measuring changes in gravitational force comprising a pivoted gravity responsive element, a sealed air compartment carried thereby, means for changing the lever arm through which air buoyancy forces act upon said sealed air compartment to permit the relative adjustment of the buoyancy and gravity moments of said gravity responsive element, whereby changes therein due to elevation will cancel each other.

DAYTON H. CLEWELL.